United States Patent [19]

Turpin

[11] Patent Number: 4,967,523

[45] **Date of Patent: * Nov. 6, 1990**

[54] FUNERAL VAULT

[76] Inventor: Rowland A. Turpin, Rte. One, Romance, Ark. 72136

[ * ] Notice: The portion of the term of this patent subsequent to Jul. 11, 2006 has been disclaimed.

[21] Appl. No.: 354,997

[22] Filed: May 22, 1989

Related U.S. Application Data

[63] Continuation-in-part of Ser. No. 193,140, May 6, 1988, Pat. No. 4,845,906, which is a continuation of Ser. No. 935,706, Nov. 23, 1986, abandoned, which is a continuation-in-part of Ser. No. 879,591, Jun. 27, 1986, abandoned.

[51] Int. Cl.[5] .............. C04H 13/00

[52] U.S. Cl. .............. 52/124.2; 52/124.1; 27/2

[56] References Cited

U.S. PATENT DOCUMENTS

| | | | |
|---|---|---|---|
| 235,376 | 12/1880 | Orr | 27/2 |
| 1,466,725 | 9/1923 | McMeans | 52/124.1 |
| 3,208,186 | 9/1965 | Fulton et al. | 52/140 |
| 3,208,188 | 9/1965 | Fulton et al. | 52/138 |
| 4,154,031 | 5/1979 | Williamson, Jr. | 52/124.1 |
| 4,253,220 | 3/1981 | Work | 27/7 X |
| 4,845,906 | 2/1989 | Turpin | 52/124.2 |

FOREIGN PATENT DOCUMENTS

| | | | |
|---|---|---|---|
| 406981 | 12/1924 | Fed. Rep. of Germany | 27/2 |

*Primary Examiner*—Richard E. Chilcot, Jr.
*Assistant Examiner*—Creighton Smith
*Attorney, Agent, or Firm*—Beveridge, DeGrandi & Weilacher

[57] ABSTRACT

A funeral vault having a dome and a base slidably received within a casket receiving hollow of the dome. The dome is preferably comprised of a plurality of components adhered together and covered with an outer protective cover or laminate. A sloped extension is provided along the lower edge of the dome and the base has an oppositely sloped peripheral edge such that a frictional engagement is provided between the base and dome as the base slides within the casket receiving hollow. The frictional engagement between the base increases as the base slides upwardly within the hollow interior cavity so as to provide a sealing function which prevents condensation as well as the entry of air and water within the casket receiving hollow. The base member also includes feet extending from a bottom surface of the base. The feet include a slotted section for receipt of the lowering straps. The feet also help ion pushing the base up within the casket receiving hollow as the dome is covered with soil. A protective guard is also optionally provided about the rim of the dome to avoid punctures. The dome and base combine to provide a condensation barrier and an inverted dome-shaped device is also contemplated for use as a condensation barrier within a casket.

24 Claims, 5 Drawing Sheets

FIG. 1
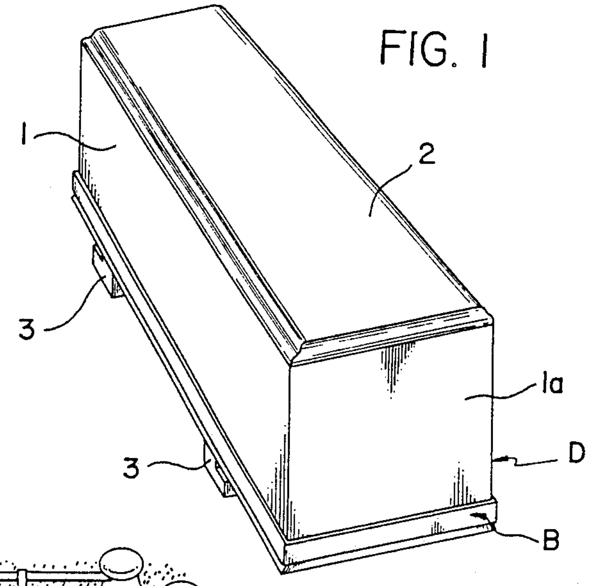
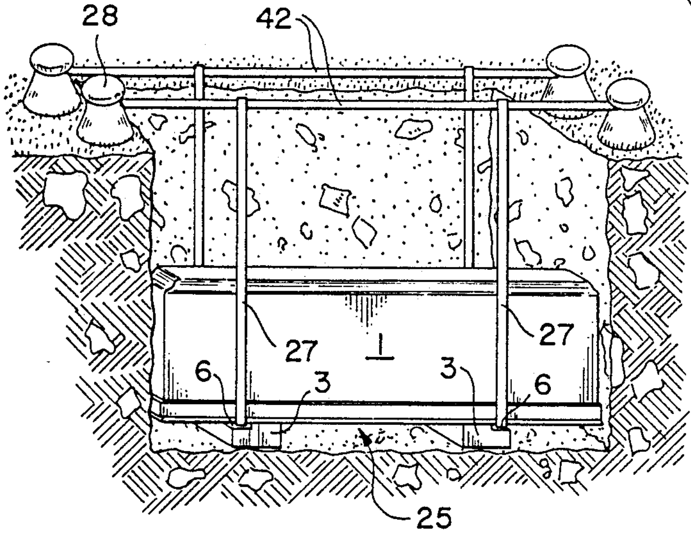
FIG. 1A
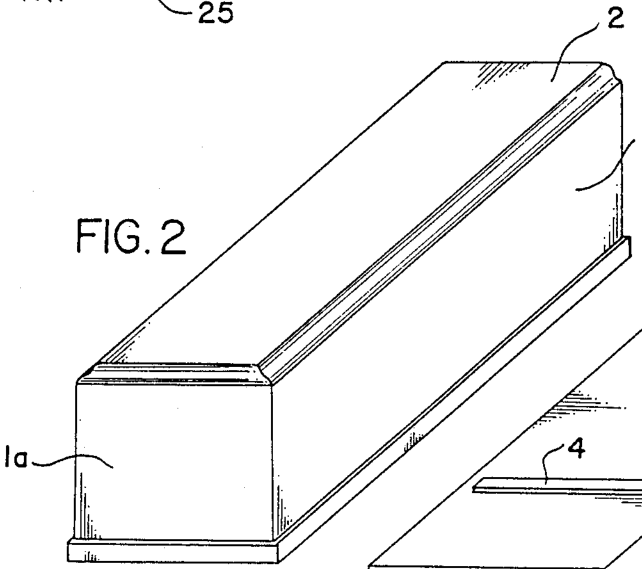
FIG. 2
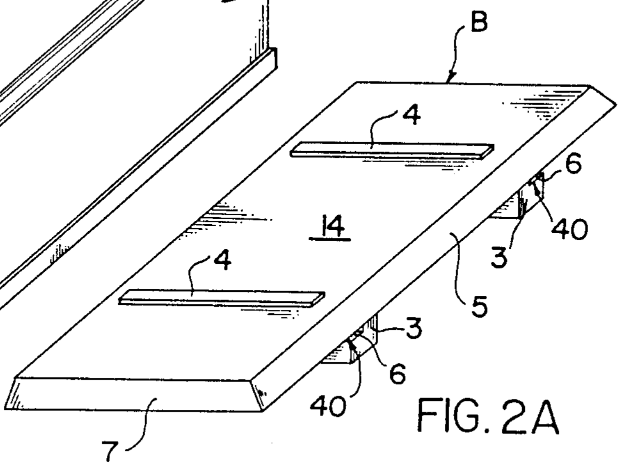
FIG. 2A

FIG. 10
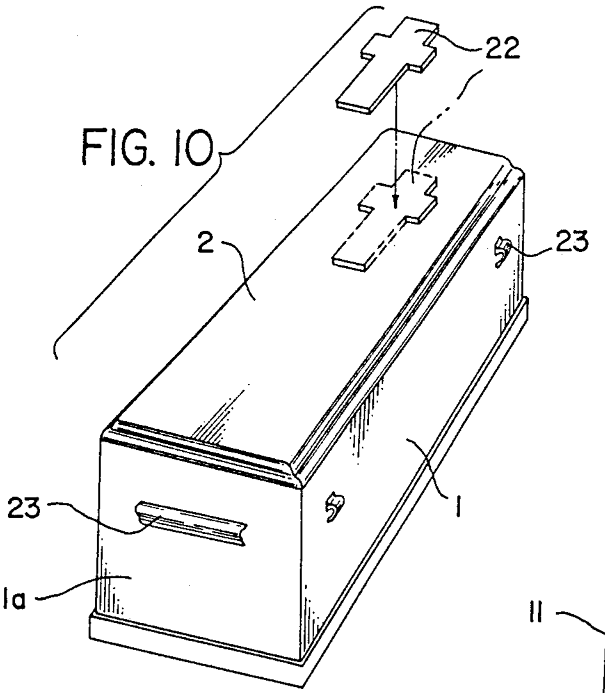
FIG. 11
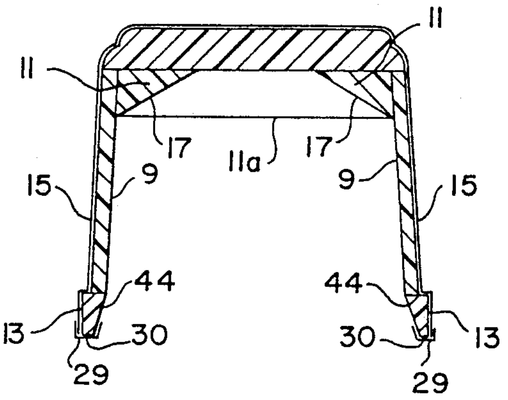
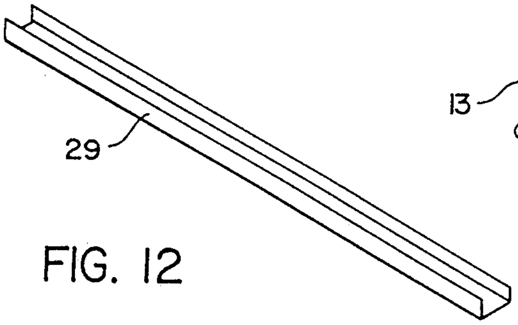
FIG. 12
FIG. 13
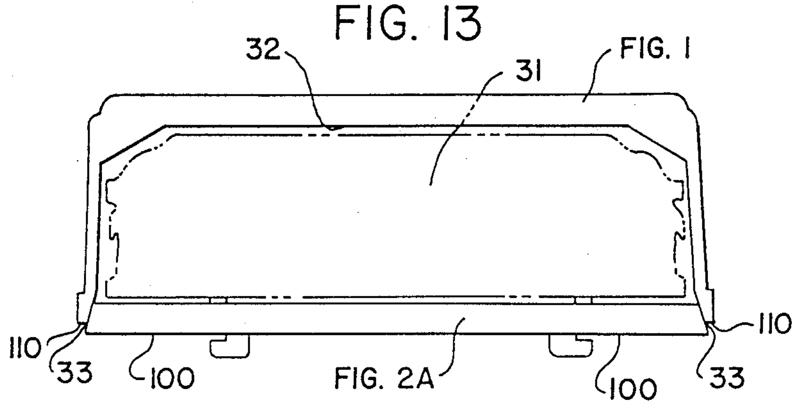

FIG. 14
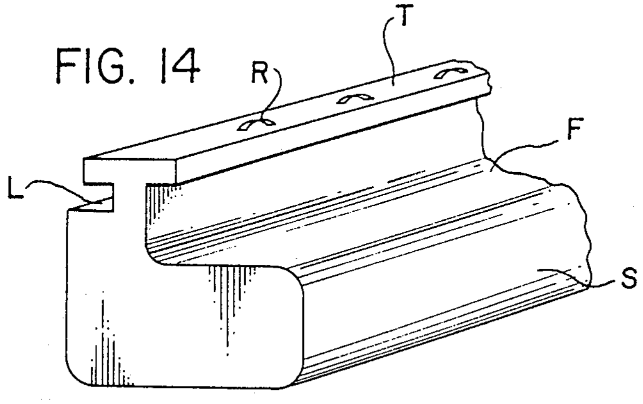
FIG. 16
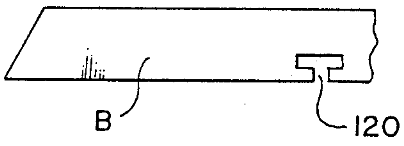
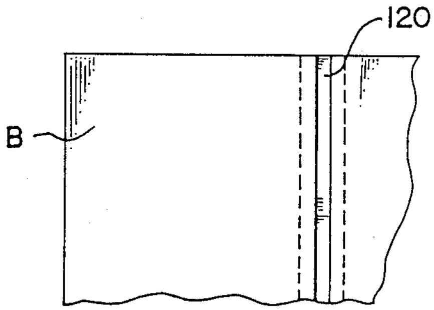
FIG. 15
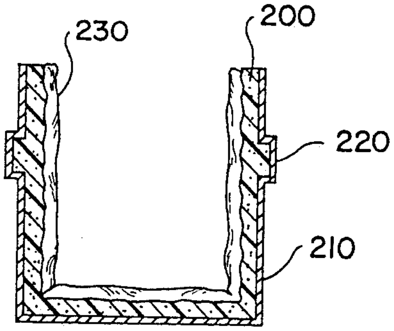
FIG. 17
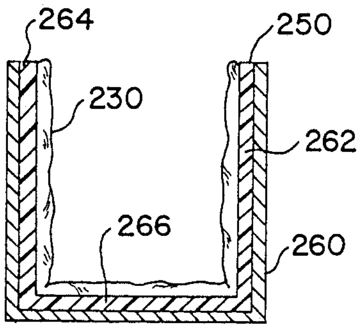
FIG. 18
FIG. 18A
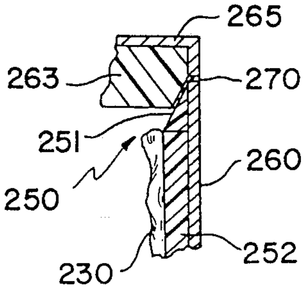

FUNERAL VAULT

CROSS REFERENCE TO RELATED APPLICATIONS

The present application is a Continuation-In-Part of U.S. Application Ser. No. 07/193,140 filed May 6, 1988, which is a continuation of Ser. No. 06/935,706 filed Nov. 23, 1986, now abandoned, which is a Continuation-In-Part of Ser. No. 06/879,591, filed June 27, 1986, now abandoned. Further, Ser. Nos. 07/193,140 and 06/935,706 and 06/879,591 are hereby incorporated by reference.

BACKGROUND OF THE INVENTION

1. Field of the Invention

The present invention relates generally to burial vaults. More particularly, the present invention is directed to a two piece insulated burial vault assembled from components bonded together consisting of an insulating core or liner and an outer shell or covering adapted to compressively surround and seal an internally disposed casket or coffin during and after the burial process.

2. Description of Related Art

The known prior art reveals a plurality of burial vaults comprising one or more cooperative parts which are adapted to be fitted together. Burial vaults of the "air-seal" type which are comprised of molded synthetic plastic, resinous and other thin walled materials are also well known in the art. However, their sealing ability is in question because of deformation due to inadequate strength and none heretofore are believed by the Applicant to provide a preventive means of reducing condensation.

U.S. Pat. No. 235,376, issued to Orr on Dec. 14, 1880, discloses a multi-piece coffin in which the top section is adapted to be placed on a lower containment section and in which the lower section includes offset shoulders for attaching handles so that the weight of the coffin would be supported from the bottom instead of the sides. The ledges referred to therein do not accommodate the conventional lowering straps for removal after internment.

Work, U.S. Pat. No. 4,253,220, issued on Mar. 3, 1981, discloses a burial vault in which a lower container is adapted to receive a coffin to be disposed therewithin, and an upper top is fitted to the lower container. However, Work does not employ the air seal principle, and compression of the top against the bottom or base does not provide an air tight or water tight seal which simultaneously pressurizes the interior of the vault after burying, and which inherently resists the corrosive effects of water and ground chemicals. Moreover, Work has no significant insulating qualities.

A mausoleum device is shown in U.S. Pat. No. 1,466,725, issued Sept. 4, 1923 to McMeans. This invention discloses a lower base having a plurality of spaced apart tapered extensions rising upwardly from the floor of the base for supporting in elevated disposition an internally disposed casket. An upper cover is placed over the casket and the base but no operationally effective seal is provided by the action of placing the cover upon the base.

Perhaps the most pertinent prior art known to applicant is disclosed in U.S. Pat. Nos. 3,208,186 and 3,208,188, issued to B. A. Fulton on Sept. 28, 1965. Of these patents, U.S. Pat. No. 3,208,188 is most germane. It discloses a lower base adapted to be lowered into the ground, and which receives an upper box-like cover adapted to be fitted to the outer peripheral edges of the base member. A plurality of internally disposed reinforcing ribs are associated with the interior surface of the cover but appear not to make contact with the disposed casket. Also, the base is prevented from rising into the cover by a flange on the base.

Prior art funeral caskets are also subject to the formation of condensation both on the interior and exterior of the casket. Linings in the prior art funeral caskets typically include cloth padding with silk exteriors. The linings, however, are not suited for preventing the formation of condensation.

It is Applicant's belief that there has never been either a burial vault or casket manufactured with an insulating core or liner to prevent condensation from forming in the vault. Moreover, it is not believed to be known in the art, other than from the present invention, to provide a two piece burial vault of the air seal type in which subsequent pressure provided by the accumulated dirt disposed within the grave urges the two members together in such a fashion so as to continuously maintain an internal seal without the requirements for additional sealing components. Further, it is Applicant's belief that it is not known in the prior art to integrate the strength of the casket with that of the vault.

In particular, it would seem advantageous to provide a two piece air seal burial vault system in which the interior, in which the casket is disposed, becomes pressurized by the weight of the earth forcing the dome down over the base. It would also be desirable to provide an overall configuration in which the geometry of the various parts aids in strengthening the overall combination to enable the successful use of insulating materials and thin-wall, lightweight outer components.

It would be advantageous to provide an insulating liner or core which could be adapted to existing burial vaults to prevent condensation and to strengthen thin wall characteristics of existing vaults.

The cost of manufacture can be reduced by assembling pre-cut pieces to form the insulating liner achieving the desired thickness and strength without the need of costly molds.

It would be advantageous to provide an insulating liner or core which would be water resistant and bonded with water resistant adhesives and to be bonded to an outer water resistant skin, shell or cover of polyethylene, polypropalene, plastic resinous material, metal or any other suitable material.

It would be advantageous to provide a device within the system which would contribute to leveling the vault upon the uneven surface of the bottom of the grave.

It would be advantageous to provide a means for easy removal of the conventional "endless" lowering straps which must be pulled from underneath either end of the vault after burial.

It would be advantageous to provide a two piece insulated burial vault which could be lowered into the grave with the casket encased in one composite unit on conventional lowering devices.

It would be advantageous to provide a two piece burial vault with surfaces on which low cost plaques, wording or handles could be attached and become integrated within the cover of the vault.

It would be advantageous to provide a base for a two piece burial vault which has optionally detachable multipurpose weight bearing feet, detachable for convenient shipping.

It would be advantageous to provide a metal channel to the bottom of the lightweight burial vault to strengthen the rim to prevent puncture of the rim and seal by rocks within the bottom of the grave.

It would be advantageous to provide a method of producing, attaching and integrating plaques, crosses, wording, decoration and or handles into and onto the lightweight insulated burial vaults.

SUMMARY OF THE INVENTION

The present invention comprises a two piece burial vault which includes a cooperating pair of assembled, bonded, insulated members which are adapted to be frictionally, forcibly coupled together to surround, seal and enclose a conventional casket. Preferably the invention comprises a lower base unit which supports and distributes the weight of the composite coffin and vault upon the lowering straps and assists in leveling the vault within the grave, and an upper dome-like enclosure adapted to be frictionally, forcibly coupled to the lower base and forcibly maintained in relation therewith by the subsequent compressive forces of accumulated dirt after burying the vault. The base is so designed for easy removal of conventional lowering straps and as a plunger for compression into and within the dome. The dome is designed with a top configuration which matingly receives the top of the casket for combining the strength of the casket with that of the vault.

The generally rectangular base preferably includes an inner surface from which a pair of upwardly projecting transverse surfaces emanate and which support the casket and concentrate the weight of the casket and vault upon the lowering straps. The sides and ends of the base are appropriately angled, or sloped, for frictional interfitting with similarly configured internal bottom sidewalls and bottom endwalls of the dome.

Preferably the base has a liner or core of insulating material of high density expanded polystyrene or material of comparable strength and insulating qualities, and an outer bottom from which a pair of downwardly projecting feet emanate, which may be optionally detached for shipping. The downwardly projecting feet, when in contact with the grave bottom, affect leveling over the uneven surface of the grave bottom while maintaining the base above the grave bottom to facilitate the removal of the lowering straps. The feet of the base are slotted above and in between the bottom of the base and the top of the feet which hook over the lowering straps of a conventional lowering device, when in the wound-up display position, to stabilize the base and prevent winds or other forces from blowing the base off the device before the casket is placed upon it. The positioning of the slots as such also ensures that even when the emanating feet sink downward in a soft grave bottom, the straps can still be slid out from their protective slot position although detachment at one end is required in such an instance. Preferably the base is covered or encased by a shell or water resistant material, molded or applied in any available manner.

The assembled dome is adapted to be frictionally, forcibly coupled to the base. It includes a liner or core of insulation to prevent condensation and an outer shell, either molded, formed, sprayed or applied in any appropriate manner which produces a water resistant outward covering. When assembled, the dome includes an upper top and a pair of spaced apart integral ends and associated integral sides. The innermost bottoms of the walls and ends of the dome slope upwards from the bottom inside rim appropriately so as to cooperate and frictionally forcibly sealably engage the cooperating inclined outer side walls and end walls of the base. Preferably the inclination of working surfaces of the dome are less extreme than the inclination of the working surfaces of the base to activate a tighter wedge-like seal without the application of any additional sealing compounds. A preferred differentiation is ½ a degree. The preferred range of inward inclination from the vertical for the periphery of the base includes 2½to 4½ degrees and more preferably about 3½ degrees. Moreover, the preferred range of outward inclination of the end and side walls of the dome is about 2 to 4 degrees and more preferably 3 degrees.

The ceiling of the uppermost innermost wall of the dome is framed with a sloping, mitered configuration intended to subsequently nest upon the enclosed casket, thus combining the strength of the casket with that of the vault.

Subsequent to the placing of the casket upon the base and the fitting of the dome over the casket and over the base, the composite unit may be lowered into the ground upon conventional lowering straps associated with a conventional casket lowering device. After lowering, the straps may be conveniently dislodged from the receptive ledges or slots of the base which are positioned above the floor of the grave by the base feet, as aforedescribed, without interfering contact with either the bottom of the base or the lower surface of the grave. Furthermore, even when the feet of the funeral vault sink all the way down into the grave bottom, as in the situation where the grave bottom is near or at ground water level, the slots in the feet allow for easy removal of the straps by enabling disconnection of one end of the otherwise normally endless straps. With a conventional funeral vault bottom or even one with recesses in the bottom for strap location, such a removal procedure would be difficult since the ground would be in contact with the strap.

When earth is piled upon the vault during burying, the compressive forces generated thereby seal the vault tighter as the dome is forced down around the base until the dome finally comes to rest upon the enclosed casket while the interior of the vault will be somewhat pressurized so as to prevent the subsequent admission of fluids and the like.

A channel of metal or extruded material or material of equal strength may be applied to the bottom rim of the dome to guard against puncture of the rim by rocks or foreign objects.

Before there is applied a sealing coat of material over the liner or inner core, plaques, wording, crosses or decorative designs of low cost expanded polystyrene or other materials can be molded, glued or otherwise attached to the core or liner.

The present invention also features casket insulating means positioned within the interior of the casket and adapted to prevent the formation of condensation. The insulating means is preferably formed of a foamed plastic material which is rigid or semi-rigid. Suitable materials include foamed polyurethane or polystyrene. To position the insulating means within a casket, the foamed plastic can be sprayed into the interior of the casket where it adheres and eventually sets into a rigid or semi-rigid state. Alternatively, the insulating means can be molded as a single component and dimensioned so as to be frictionably insertable into the casket. Adhesive or other suitable attachments can be used to secure the insulating means in place. The insulating means might also be formed of a plurality of components which are adhered together and frictionably inserted into the casket. Once the insulating means is in place within a metal casket or the like, a condensation barrier is created which acts to prevent the formation of condensation.

An object of the present invention is to provide a lightweight, insulated two piece burial vault.

Another object of the present invention is to provide a two piece burial vault which is insulated with an inner liner or core and an outer shell or applied coating of the character described of the air seal type.

Another object of the present invention is to provide an improved, insulated, funeral vault which is adapted to prevent fluid seepage.

Yet another object of the present invention is to provide a two piece burial vault which is insulated with an inner liner or core and includes an outer shell or applied coating and is adapted to have its interior pressurized to prevent admission or accumulation of water therein.

A similar broad object of the present invention is to provide a funeral vault of the character described which is internally pressurized.

Another similar object of the present invention is to provide a funeral vault of the character described which includes a unique sliding seal.

Another broad object of the present invention is to provide an improved funeral vault with an insulating liner or core constructed of expanded polystyrene or other material of equal or better strength and insulating qualities.

Yet another object of the present invention is to provide an insulating liner or core for funeral vaults or caskets of expanded polystyrene or other material of equal or better strength and insulating qualities to be adapted to heretofore and hereafter existing funeral vaults or caskets as an improvement to prohibit condensation forming on the vault or casket.

Another object of the present invention is to provide a funeral vault comprised of an insulating liner or core and a seamless or water resistant outer shell either molded, formed, sprayed or applied in any appropriate manner.

Yet another object of the present invention is to produce an insulating core or liner for funeral vaults either by molding or by assembling pre-cut components of insulating material such as expanded polystyrene or other material of equal or better strength and insulating qualities.

Another object of the present invention is to provide an outer shell, skin or cover of polystyrene, polyurethane, plastic, plastic resinous materials, metal or any other material which is water impervious.

Another object of the invention is to provide an improved burial vault where the ceiling of the uppermost innermost wall of the dome is framed with a sloping, mitered configuration intended to subsequently nest upon the enclosed coffin, thereby integrating the strength of the casket with that of the vault.

Yet another object of the present invention is to provide a funeral vault of the nature described which includes an improved base member.

Still another object of the present invention is to provide an improved funeral vault which includes an insulated base member with an outer shell or applied coating.

Another object of the present invention is to provide a funeral vault of the character described with an improved base member with an inner surface from which a pair of upwardly projecting transverse surfaces emanate and which support the casket and concentrate the weight of the casket and vault upon the lowering straps.

Another object of the present invention is to provide a funeral vault of the character described with an improved base member with the sides and ends appropriately angled or sloped for frictional interfitting with similarly configured internal angles or slopes of the inner bottom of the dome.

Another object of the present invention is to provide a funeral vault of the character described with an improved base member with an outer or bottom surface from which a pair of downwardly projecting feet emanate, which may be optionally detached.

Still another object of the present invention is to provide an improved base member of the character described with an outer or bottom surface from which a pair of downwardly projecting feet emanate to contact the floor of the grave and assist in leveling the vault over uneven earth.

Another object of the present invention is to provide a funeral vault with an improved base member with a bottom surface from which a pair of downwardly projecting feet emanate to make contact with the grave bottom and hold the base above the grave bottom to facilitate the removal of the lowering straps.

Another object of the invention is to provide an improved funeral vault with an improved base member with downwardly projecting feet or supports, which have slots transverse between the bottom of the base and the feet or supports, for stabilizing the base member upon the lowering device and, in the event the grave bottom is such that the feet sink therein, to still enable easy release of the straps.

A broad object of the present invention is to provide a funeral vault with an improved base member from which the downwardly projecting feet serve a multipurpose.

Yet another object of the present invention is to provide a funeral vault of the nature described whereby the dome of the vault will come to rest on and be assisted in supporting the earth above the vault by the encapsulated casket.

Yet another object of the present invention is to provide a funeral vault which can be conveniently lowered in one unit by means of conventional lowering devices into the burial site with the casket sealably encased.

Still another object of the present invention is to provide a method for manufacturing an improved funeral vault of the nature described.

Yet another object of the present invention is to provide an improved funeral vault which is structurally adapted to provide an air-tight, water-tight seal which obviates the use of additional sealants.

A related object of the present invention is to provide a funeral vault of the character described which seals more tightly as greater weights of burial earth are applied.

Another object of the present invention is to provide an improved funeral vault which resists corrosion and the accumulation of water formed by condensation.

Another object of the present invention is to provide rigid or semi-rigid foamed plastic insulating means on the interior of a casket which creates a condensation barrier.

These and other objects and advantages of the present invention, along with features a novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views;

FIG. 1 is a perspective view of the assembled burial vault constructed in accordance with the best mode of the present invention.

FIG. 1A is a fragmentary pictorial view illustrating the lowering of the composite vault and casket into the grave by the straps associated with a conventional lowering device.

FIG. 2 is a perspective view of the dome of the present invention.

FIG. 2A is a perspective view of the base of the present invention.

FIG. 10 an illustration describing a method of attaching plaques, wording, crosses, and or handles before applying an outside shell or material.

FIG. 11 is a view of the optional application of a channel of metal or reinforcing material to be applied to the bottom rim of the dome.

FIG. 12 is a perspective view of a typical channel to be attached optionally to the bottom rim of the dome.

FIG. 13 is a fragmentary pictorial view illustrating the position of the casket within the vault at the point of primary sealing.

FIG. 14 is a cut away view of an optionally detachable foot.

FIG. 15 is a bottom view, partially cut-away of the base showing the slot formed in the base for receipt of the detachable foot shown in FIG. 14.

FIG. 16 is a side view, partially cut-away, of the slot formed in the base.

FIG. 17 shows, in cross-section, the insulating means within a casket.

FIG. 18 shows, in cross-section, the multi-componented insulating means within a casket.

FIG. 18A shows, in cut-away, an alternate embodiment of the multi-component insulating means.

DETAILED DESCRIPTION OF THE DRAWINGS

Figure 3:
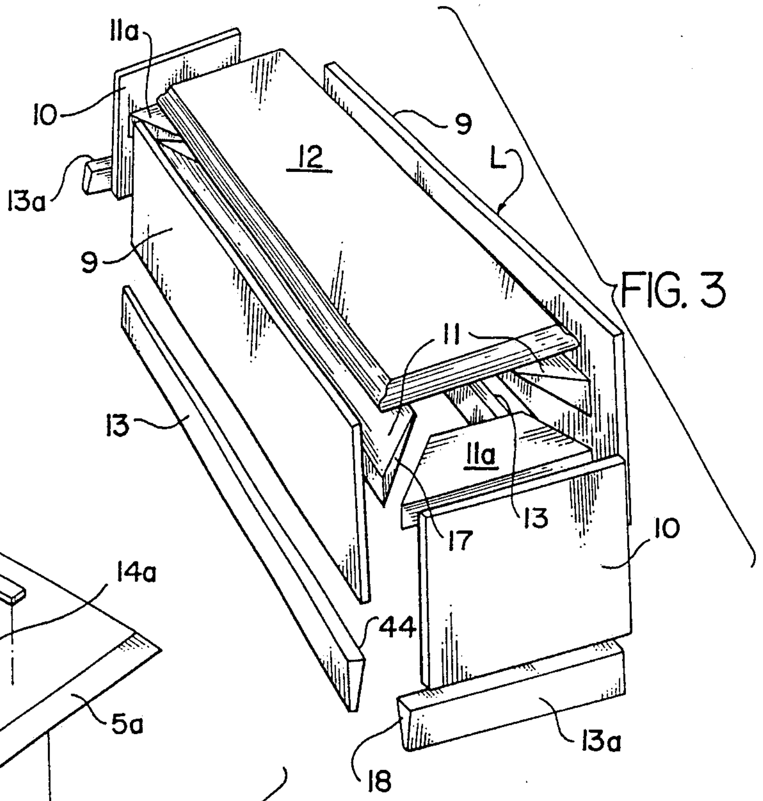
FIG. 3 is an exploded perspective view of the inner core or liner of the dome.

A typical and preferred embodiment of the invention is illustrated in the drawings, wherein it is generally indicated at FIG. 1 and comprises dome D and base B.

Figure 9:
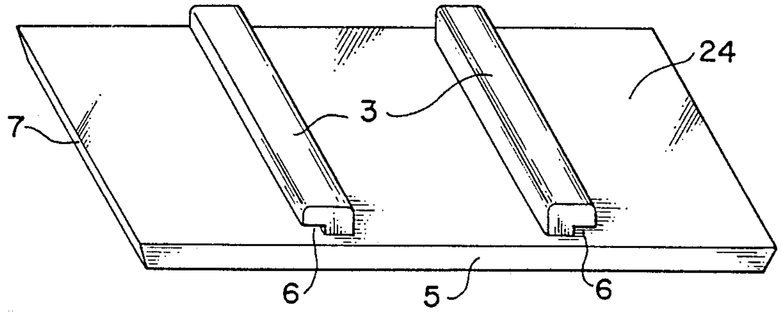
FIG. 9 is a perspective view of the bottom of the base illustrating the sloped sidewalls and endwalls and the unique configuration of the multiple purpose feet.

As shown in FIG. 2A, base B includes bottom wall 24 (FIG. 9) with upward and inward sloping sidewalls 5 and upward and inward sloping end walls 7. The angle at which the sidewalls 5 and end walls slope inwardly is preferably within the range of about 2½ to 4½ degrees. Top wall 14 of base B has a pair of upwardly projecting casket supports 4 and bottom wall 24 has a pair of downwardly projecting, multi-purpose feet or supports 3 transverse to the base. Feet 3 of base B each include slots 6 between bottom wall 24 of base B and extension 40 of feet 3. The slots are adapted to receive and accommodate lowering straps 27 of a conventional lowering device 28 (FIG. 1A), when the lowering device is in its wound up display position, thereby preventing the dislodging of base B from straps 27 of lowering device 28 by wind or other forces at the grave site. The slots can be of a depth sufficient to receive only a portion of the width of the straps or, alternatively, the straps can be of a depth which is essentially the same as the width of the straps.

Feet 3 of base B assist in affecting a more level resting of the vault upon the bottom of the uneven grave 25 (FIG. 1A). Feet 3 also support base B above grave bottom 25 sufficiently to allow for the removal of lowering straps by sliding strap 27 towards and past the ends of base B. Feet 3 ensure that straps 27 are not obstructed by grave bottom 25 or the bottom of base B as they are slid off. If grave bottom 25 is such that feet 3 sink into the ground below, and the bottom base B contacts grave surface 25, slots 6 (when of sufficient depth) ensure that straps 27 can still be removed only there is required the further step of disconnecting one end of each strap from bar 42.

Figure 5:
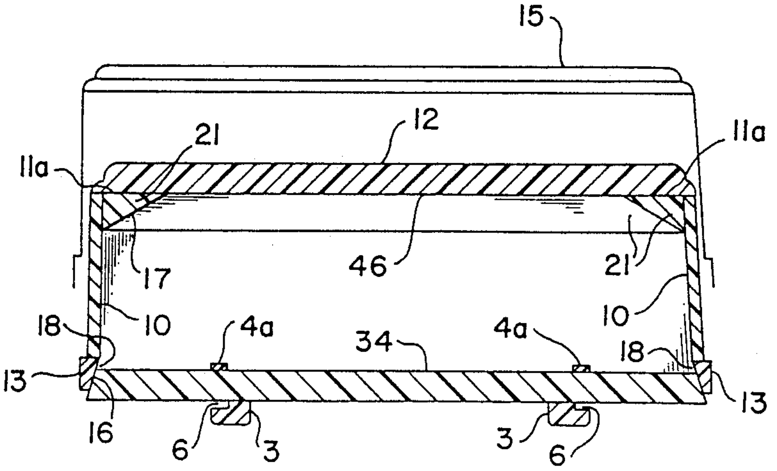
FIG. 5 is a sectional side view of the vault.
Figure 6:
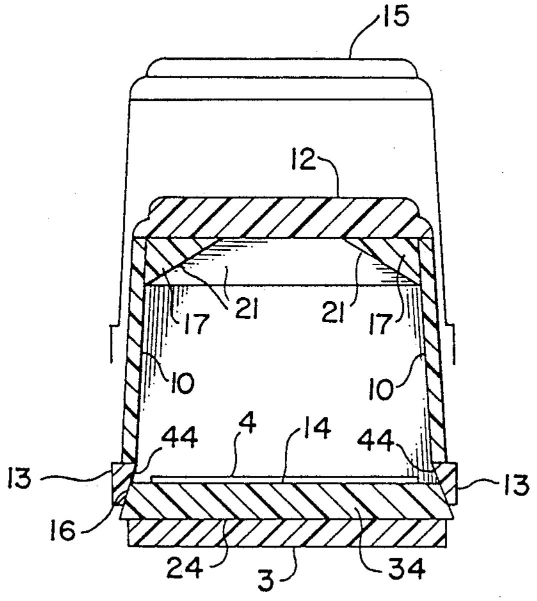
FIG. 6 is a sectional end view of the vault.
Figure 7:
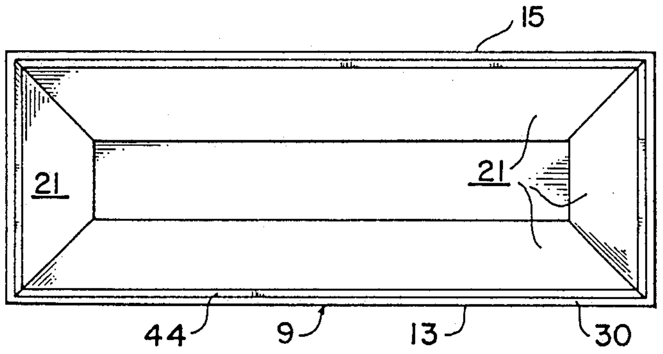
FIG. 7 is an interior view of the vault illustrating the internal ceiling and tapered or sloped bottom of the dome.
Figure 8:
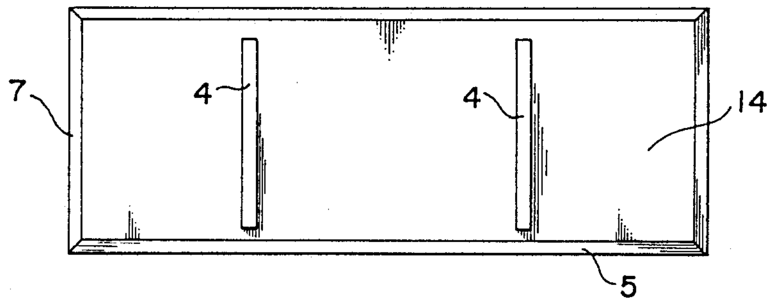
FIG. 8 is a view of the upper surface of the base illustrating the sloped side walls and end walls and the position of the casket supports.

As shown in FIG. 3, dome D is constructed of an inner core or liner L of insulating material of a thickness required to achieve the desired goals of strength and insulation. Liner L includes top 12, a pair of endwalls 10, a pair of sidewalls 9, two sloping bottom sidewalls 13, two sloping bottom endwalls 13A, two picture frame-like mitered, nesting side supports 11 having bottom surfaces 17 which slope upwardly and inwardly towards the center of the dome's top cover. Liner L further includes two picture frame-like, mitered, nesting end supports 11*a*, having bottom surfaces sloping upwardly and inwardly in like the same manner as bottom surfaces 17 of side support 11. Liner L also includes outer shell 15 (FIG. 5) having thin wall design, constructed of plastics, resinous plastics, urethanes, metal or any other suitable material. When assembled, the resting supports provide a subsequent nesting receptacle 21 (FIG. 5) to receive and mesh with the uppermost top of the casket 31, thus integrating the strength of the casket with that of the dome.

Figure 4:
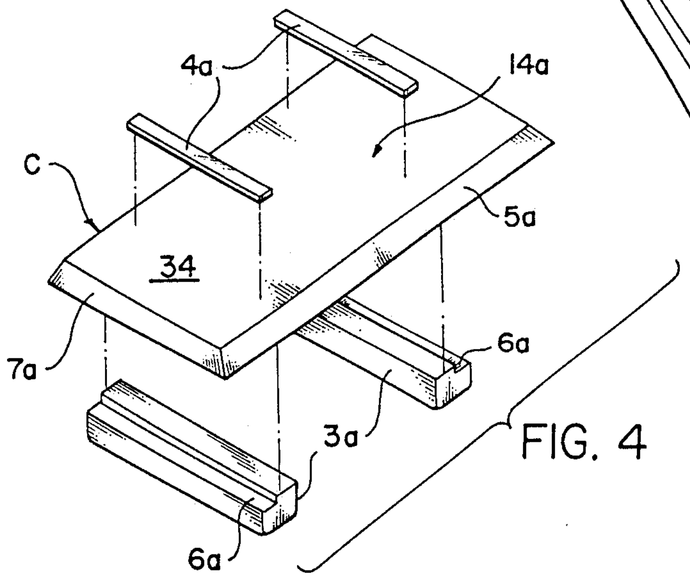
FIG. 4 is an exploded perspective view of the internal core of liner of the base.

As shown in FIG. 4, base B includes an inner body C formed of insulating material such as polyurethane having a thickness sufficient to achieve the desired goals of strength, insulation and proper sealing. Base B is comprised of main member 34, two casket supports 4*a*, two feet 3*a*, and an outer shell (not shown) which covers base B in a manner similar to the way cover 15 covers or coats dome D in FIG. 5.

The components of dome D's insulating core or liner L are bonded together with an appropriate water resistant adhesive such as an epoxy resin or a cellulose adhesive to form one solid dome unit of any outside configuration and design to accommodate a bonded outer shell of manufacturer's design or to receive a coat or covering of water resistant material of the manufacturer's choice.

The components of the insulating body C of base B (FIG. 4) are also bonded together with an appropriate water resistant adhesive to form one solid base unit to accommodate an outer shell in a proper meshing arrangement as discussed more fully below. The insulating body C is also preferably covered with a coating which is similar to that applied to dome D.

FIG. 10 illustrates the accommodation of surfaces, 1, 2 and 2a for the application of plaques, crosses 22, wording and or handles 23 which can be molded from inexpensive materials and are applied or attached to liner L before applying a top shell or a coat of material, thereby integrating the design configuration with that of the finished vault.

An optional feature of the invention is to bond, with an appropriate adhesive, metal channel 28 (FIG. 12) or an extrusion of any material of equal strength to the bottom rim of the vault dome at points 13, 18 and 30. Channel 28 provides added strength and prevents puncturing of the rim by underlying rocks within the grave.

Subsequent to the placement of casket 31 upon base B and the fitting of dome D over casket 31, base B becomes mated with dome D in a preliminary sealing position as shown in FIG. 13. Moreover, in the preliminary sealing position base B will have its sloped sides 5a and ends 7a in abutment with end surfaces 18 and side surfaces 44 of dome D about midway up along the sloped surfaces of end and sidewalls 18 and 44. This arrangement provides the composite unit with a preliminary seal while reserving space 32 and peripheral portion 33 (FIG. 13) for upward movement of base B and the casket 31 into dome D by forces generated by the subsequent placement of earth upon the funeral vault during the closing or covering of the grave. Base B is adapted to move upward within dome D until the top of casket 31 is forced into contact with uppermost ceiling 21 of dome D, thereby integrating the strength of casket 31 with that of dome D, and pressurizing the interior of the vault by the piston-like compressive upward thrust of the base into the dome. Also, uppermost ceiling 21 is generally configured so as to have the upper exterior of casket 31 nestle tightly within the confines of ceiling 21 such that shifting of casket 21 with respect to base B and dome D is prevented and an enhancement in strength through a close integration of the base B and dome D. Further, peripheral portion 33 of base B is preferably of a length which enables bottom surface 100 to be essentially coplanar with bottom rim 110 of dome D or, alternatively, above rim 110 and completely within the hollow interior of dome D.

FIG. 14 shows, partially cut-away, detachable foot F having T-shaped upper extension T, ledge L and support extension S. Detachable foot F is adapted to slide within T-shaped slot 120 formed within the bottom of base B. FIGS. 15 and 16 show the left slot. Although not shown, a right slot would also be formed to receive a second detachable foot. Preferably the tolerances are such that foot F can be fairly easily slid in slot without undue movement thereafter. If necessary, deflectable, raised members R can be formed on the upper surface of extension T to provide greater frictional contact between foot F and the base surface defining slot 120 to ensure no movement therebetween.

FIG. 17 shows, in cross-section, insulating means 200 in position within casket 210 which is shown to be a metal stamped casket with rib 220 provided for extra strength. Insulating means 200 is preferably a rigid or semi-rigid foamed plastic which is applied by spraying molten foamed plastic along the inner surface of casket 210 and allowing it to harden. The spraying of foamed plastic is especially suited for metal caskets formed with inner surfaces having ribs or the like. FIG. 17 also illustrates the positioning of paddings 230 which are used essentially for aesthetic purposes only and often have silk exterior surfaces.

Insulating means 200 acts as a condensation barrier which prevents the formation of condensation forming on the interior or the exterior of casket 210.

FIG. 18 illustrates a multi-componented insulating means 250 having sides 262,264, bottom 266 and ends (not shown) which are preferably adhered together. Alternatively, insulating means 250 can be formed on a unitary body such as by a molding process.

FIG. 18A shows an alternate embodiment of insulating means 250 shown in FIG. 18A. FIG. 18A illustrates wedge member 251 which is secured to the upper edge of side section 252. Similar wedge members are positioned on the upper edge of the end sections and other side section not shown. Many caskets include their own sealing means (e.g., 270, FIG. 18A) with the attachments of base member 263 to the undersurface of casket cover 265, it is possible to provide for even greater insulation. Preferably base member 263 is in the shape of a rectangular block with an angled periphery. The angle orientation between base member 263 and wedges 251 is preferably the same as that between dome D and base B of the previously described funeral vault. In the event a funeral vault is not utilized during burial, the weight of dirt or the like accumulating on casket cover 265 acts to compress base member 263 (attached to the undersurface of the casket cover 265) down and into an even greater sealing relationship with insulating means 250.

It will thus be seen from the foregoing description, considered in conjunction with the accompanying drawings that the present invention provides a new and improved lightweight burial vault having the desirable advantages and characteristics, and accomplishing its intended objects, including those heretofore pointed out and others which are inherent in the invention. The present invention also contemplates the use of other foamed plastics to provide a rigid or semi-rigid foamed structure.

What is claimed is:

1. A funeral vault, comprising:

a dome having formed therein a casket receiving hollow;

a base, adapted for insertion within said casket receiving hollow, said base including a main body with an upper and a bottom surface, and first and second feet extending off of said bottom surface, each of said feet having a ledge formed therein extending essentially parallel with said bottom surface and a distance below said bottom surface.

2. A funeral vault as recited in claim 1, wherein each of said feet is releasably attached to said main body.

3. A funeral vault as recited in claim 2, wherein each of said feet includes a T-shaped upper extension and said main body includes recesses formed therein which are adapted to receive, in releasably locking fashion, said T-shaped upper extensions.

4. A funeral vault as recited in claim 1, wherein said base further comprises first and second protrusions extending off of the upper surface of said main body, and said first protrusion being positioned above the first of said feet such that a vertical plane passing through said first protrusion passes through the first of said feet and said second protrusion being positioned above the second of said feet such that a vertical plane passing through said second protrusion passes through the second of said feet.

5. A funeral vault, comprising:

a dome having formed therein a casket receiving hollow, said dome having an inner insulating core and an outer protective cover and a lower rim;

a base having a bottom surface and first and second feet extending from said bottom surface, said dome and said base being dimensioned such that said base is free to slide in a piston like fashion within the hollow formed in said dome.

6. A funeral vault as recited in claim 5, wherein said inner insulating core is comprised of a plurality of separate components attached together.

7. A funeral vault as recited in claim 6, wherein said components are each formed of polystyrene and said outer protective cover is a layer of polyurethane plastic.

8. A funeral vault as recited in claim 6, wherein said components include:

a top having an upper and a lower surface;

a pair of end walls each attached along an upper edge to said top cover;

a pair of side walls each attached along an upper edge to said top cover and along a side edge to said end walls;

a pair of sloping side extensions each attached to a lower edge of a respective one of said side walls;

a pair of sloping end extensions each attached to a lower edge of a respective one of said end walls and each sloping end extension being attached to said pair of sloping side extensions;

a pair of nesting side frame elements having an upper surface in contact with the lower surface of said top and an outer edge contacting a respective one of said side walls, said pair of nesting side frame elements each including a bottom surface which slopes upwardly from the outer edge towards the lower surface of said top; and a pair of nesting end frame elements having an upper surface in contact with the lower surface of said top and an outer edge contacting a respective one of said end walls, said pair of nesting end frame elements each including a bottom surface which slopes upwardly towards the lower surface of said top.

9. A funeral vault as recited in claim 8, wherein said outer protective cover comprises a coating of water impervious material covering the exterior of said dome.

10. A funeral vault as recited in claim 8, wherein said outer protective cover is a unitary body of water impervious material adhered to said inner core.

11. A funeral vault as recited in claim 8, wherein the bottom surface of said nesting side and end frame elements defines a nesting recess having the same general configuration as an upper surface of a casket to be contained within said dome.

12. A funeral vault as recited in claim 11, wherein said base is adapted to slide up within the hollow formed in said dome an amount which places an upper surface of a casket to be stored in said funeral vault in contact with the bottom surface of said nesting side and end frame elements.

13. A funeral vault as recited in claim 10, wherein said sloping end and side extensions have an interior surface which slopes vertically outwardly by an angle of about 2 to 4 and said base has peripheral side and end edges which slope vertically inwardly by an angle of about $2\frac{1}{2}$ to $4\frac{1}{2}$ degrees and are adapted for frictional engagement with said sloping end and side extensions, with the degree of frictional contact increasing as said base slides upwardly within the casket receiving hollow of said dome.

14. A funeral vault as recited in claim 13, wherein said base and said sloping end and side extensions are formed of compressible material which compresses so as to provide an air and water impervious seal between said base and said dome when said funeral vault is in a final resting state.

15. A funeral vault as recited in claim 5, further comprising a U-shaped guard positioned so as to cover a portion of the lower rim of said dome, said U-shaped guard providing means for protecting the lower rim of said dome from puncture by rocks or foreign objects.

16. A funeral vault as recited in claim 5, further comprising a configured body fixedly positioned between the exterior surface of said inner insulating core and the interior surface of said protective cover.

17. A funeral vault as recited in claim 5, wherein said base is adapted to slide within the casket receiving hollow in said dome such that the bottom surface of said base is coplanar or above the lower rim of said dome.

18. A funeral vault as recited in claim 17, wherein said base includes an insulating body having an outermost periphery which is encompassed by a protective covering.

19. A funeral vault as recited in claim 5, wherein said insulating core is formed of expanded polystyrene.

20. A funeral vault as recited in claim 19, wherein said base is comprised of expanded polystyrene.

21. An insulating barrier for use in a funeral casket, comprising:

a main body of foamed plastic material having an exterior surface dimensioned and shaped so as to conform to the interior surface of the funeral casket, and said insulating barrier adapted to prevent formation of condensation on the funeral casket.

22. An insulating barrier as recited in claim 21, wherein said main body is essentially rigid and formed of a foamed polystyrene material.

23. An insulating barrier as recited in claim 21, wherein said main body is essentially rigid and formed of formed polyurethane material.

24. A method for providing a condensation barrier in a funeral casket with interior walls, comprising:

spraying molten foamed plastic onto the interior walls of the funeral casket such that said foamed plastic adheres to the interior walls and cools into an essentially rigid state.

* * * * *